(12) United States Patent
Kim et al.

(10) Patent No.: US 6,276,771 B1
(45) Date of Patent: Aug. 21, 2001

(54) MULTIFUNCTIONAL MACHINE FOR SCANNING AND PRINTING AND A SCANNING AND PRINTING METHOD USED IN THE MULTIFUNCTIONAL MACHINE

(75) Inventors: Young-Hoon Kim; Ji-Hoon Han, both of Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/144,539

(22) Filed: Aug. 31, 1998

(30) Foreign Application Priority Data

Aug. 29, 1997 (KR) .................................................. 97/42789

(51) Int. Cl.[7] .................................................. H04N 1/034
(52) U.S. Cl. ................................................ 347/3; 358/472
(58) Field of Search ......................... 347/3, 19; 358/472; 400/73

(56) References Cited

U.S. PATENT DOCUMENTS 4,809,080 * 2/1989 Kotani et al. ........................ 358/472
5,264,949 * 11/1993 Stemmle ............................... 358/474
5,812,172 * 9/1998 Yamada ................................. 347/171

* cited by examiner

Primary Examiner—John E. Barlow, Jr.
Assistant Examiner—Craig A. Hallacher
(74) Attorney, Agent, or Firm—Robert E. Bushnell, Esq.

(57) ABSTRACT

A multifunctional machine for scanning and printing and a scanning and printing method used in the multifunctional machine are capable of reducing the volume of the multifunctional machine and reducing data amount relative to parts other than a document when scanning a document smaller than a reference size document. The document or a printable medium is fed in a sub-scanning direction by a feeding unit. A scanner module scans the document by performing shuttle movement in a main scanning direction perpendicular to the sub-scanning direction, and a printer module is established next to the scanner module in the sub-scanning direction for printing data onto the printable medium. In addition, a white panel is located facing the bottom side of the scanner module in the main scanning direction, and a black panel is located facing the bottom side of the printer module in the main scanning direction.

26 Claims, 3 Drawing Sheets

MULTIFUNCTIONAL MACHINE FOR SCANNING AND PRINTING AND A SCANNING AND PRINTING METHOD USED IN THE MULTIFUNCTIONAL MACHINE

CLAIM OF PRIORITY

This application makes reference to, incorporates the same herein, and claims all benefits accruing under 35 U.S.C. § 119 from an application for MULTIFUNCTIONAL MACHINE FOR SCANNING AND PRINTING USE AND A SCANNING AND PRINTING METHOD USED IN THE MULTIFUNCTIONAL MACHINE earlier filed in the Korean Industrial Property Office on Aug. 29, 1997 and there duly assigned Ser. No. 42789/1997.

BACKGROUND OF THE INVENTION

1. Technical Field

The present invention relates to a multifunctional machine for scanning and printing use and a scanning and printing method used in the multifunctional machine. More particularly, the invention relates to a multifunctional machine for scanning and printing use, and a scanning and printing method used in the multifunctional machine, capable of reducing the volume of the multifunctional machine and of reducing the amount of data relating to parts other than a document when scanning a document smaller than a reference size document.

2. Related Art

At present, the office automation environment has been rapidly changed in step with the development of the information-communication industry. Office automation facilities (for instance, a copier which produces scanned image data, a facsimile device having a data transmission function which receives and sends facsimile image data through long distance communication, and a scanner which processes an image such as a document or a photograph) have been continuously developed and supplied.

Since the office automation facilities, each having a separate function, are located at various places within the office, space becomes limited and the working efficiency of the operator is degraded. In order to solve the above problems, a multifunctional machine integrating a number of functional units has been introduced, and at generally performs the functions of a scanner, facsimile and printer. However, in the multifunctional machine having the functions of a scanner, facsimile and printer, an unexpected deficiency can occur due to reciprocal operation of the functions. After explaining the structure and operation of a single scanner and a printer, the multifunctional machine integrating the scanner and printer, and the problems occurring in the multifunctional machine, are explained.

In the case of the scanner, when light is radiated toward a document and a charged coupled device (CCD) sensor scans the light reflected from the document, image processing is performed based on the scanned data. The CCD sensor senses the difference in reflection between the document and the characters printed on the document. When scanning a document smaller than a reference size document through the above scanner, in order to prevent parts other than the document from being recognized as data and thereby printed black, a white panel which has the same color as a background color of the document is generally located at parts where the light is radiated. In addition, in the case of the ink-jet printer, characters or figures are printed by spraying ink on a printable medium through a nozzle driving unit according to a print signal which is provided in correspondence to print data from a connected computer. A black panel which has the same color as black ink is generally located at the rear surface of the printable medium. The black panel is located to prevent change of color, even if the panel located at parts other than the printable medium is contaminated, when the ink is sprayed through the ink nozzle.

Typically, a multifunctional machine includes a shuttle scanner module which directs light toward a document so as to obtain an image of the document, and a shuttle ink-jet head module located next to the shuttle scanner module for performing a printing operation. Such a multifunctional machine which integrates the scanning and printing functions is burdened by certain disadvantages.

First, since the scanner module and the ink-jet head module are located in a parallel relationship to the main scanning direction, the size of the multifunctional machine is relatively large. Second, when a document being scanned as a size which is smaller than a reference size, parts other than the document or surrounding the document are unnecessarily scanned and appear as black areas, and this unnecessarily increases the amount of data collected during the scanning operation. Third, in the latter case, when the scanned document is printed, the parts other than the document or surrounding the document are printed as black, and this unnecessarily consumes toner in the printer.

Therefore, there is a need for the development of a multifunctional machine and related method which integrates the scanning and printing functions without being burdened by the disadvantages set forth above.

SUMMARY OF THE INVENTION

Therefore, it is an object of the present invention to reduce the volume of a multifunctional machine and reduce the recognized data amount relating to parts other than a document when scanning a document smaller than a reference size document.

According to one aspect of the present invention, a multifunctional machine for scanning and printing includes: a paper feeding unit which feeds a document to be scanned or a printable medium in a sub-scanning direction; a scanner module which scans a document by performing a shuttle movement in a main scanning direction perpendicular to the sub scanning direction; a printer module which is established next to the scanner module in the sub-scanning direction and prints data onto the printable medium; a first panel which faces the bottom side of the scanner module in the main scanning direction and has a first color; and a second panel which faces the bottom side of the printer module in the main scanning direction and has a second color.

Preferably, the first panel has a white color, and the second panel has a black color.

Preferably, the scanner module is established in front of or to the rear of the printer module in the sub-scanning direction.

Another aspect of the present invention relates to a scanning and printing method for a multifunctional machine. The multifunctional machine includes: a paper feeding unit which feeds a document to be scanned or a printable medium in a sub-scanning direction; a scanner module which scans a document by performing a shuttle movement in a main scanning direction perpendicular to the sub-scanning direction; a printer module which is established next to the scanner module in the sub-scanning direction and prints data onto a printable medium; a first panel which faces the bottom side of the scanner module in the main scanning direction and has a first color; and a second panel which faces the bottom side of the printer module in the main scanning direction and has a second color. The method comprises the steps of: determining whether a signal inputted to the multifunctional machine is a printing signal or a scanning signal; performing a scanning operation by transporting the document to the first panel when a scanning signal is inputted; and performing a printing operation by transporting the printable medium to the second panel when a printing signal is inputted.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 1:
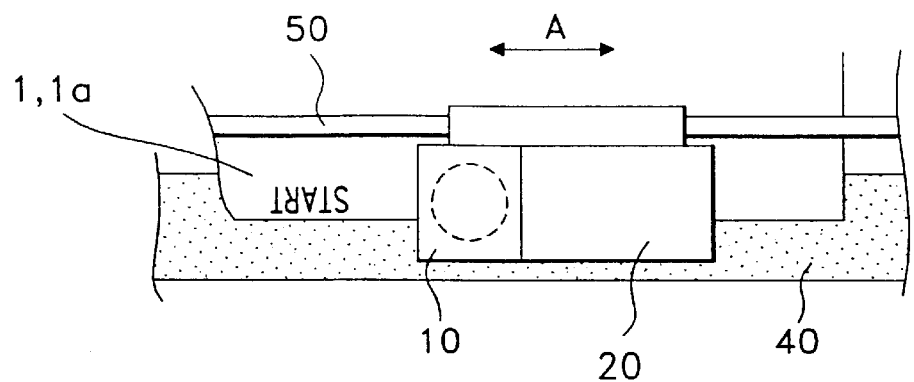
FIG. 1 is a plan view illustrating a combined module and a black panel of a multifunctional machine.
Figure 2:
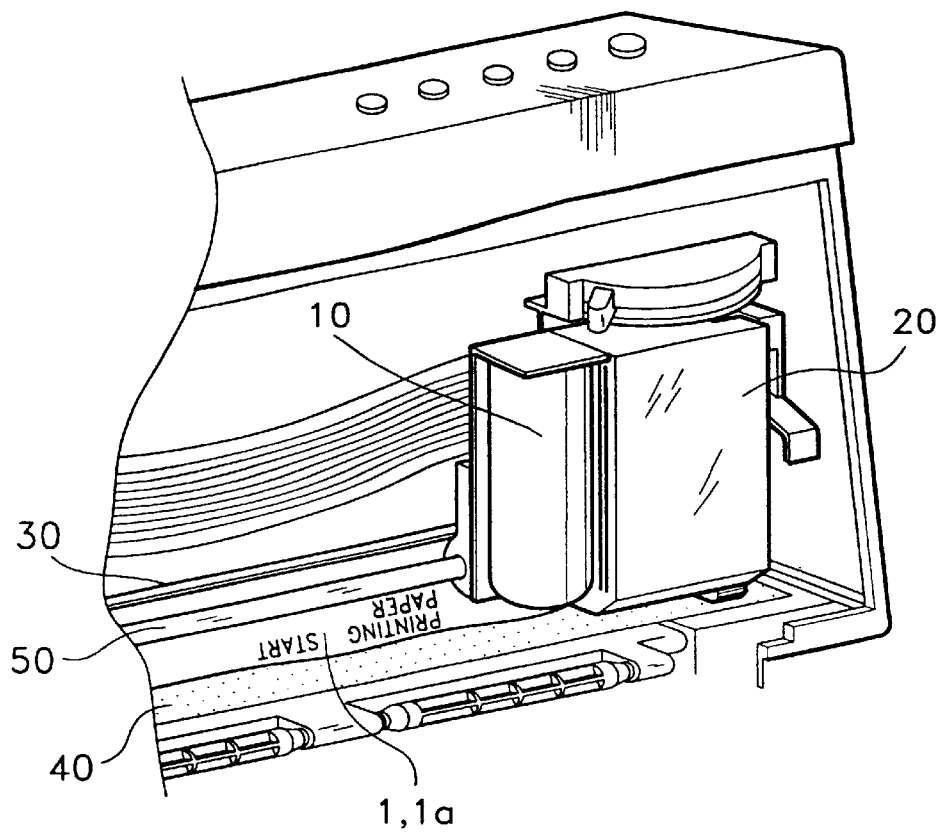
FIG. 2 is a perspective view illustrating the front surface of the multifunctional machine having the combined module.

FIG. 1 is a plan view illustrating a combined module of a multifunctional machine integrating a scanner and printer, and FIG. 2 is a perspective view of FIG. 1. The multifunctional machine includes a shuttle scanner module 10 which inputs light by directing light toward the document so as to process an image of the document 1 a in the CCD sensor; and a shuttle ink-jet head module 20 which is located next to the shuttle scanner module 10, and which performs a printing operation by spraying ink onto the printable medium 1 according to a printing signal from the CCD sensor. The shuttle scanner module 10 and the ink-jet head module 20 are connected to a common timing belt 30. The timing belt 30 is connected to a driving pulley and a driven pulley (not illustrated). In accordance with the rotating direction of the driving pulley, the shuttle scanner module 10 and the shuttle ink-jet head module 20 perform a rectilinearly reciprocating motion along a guide rail 50.

As shown in FIG. 1, assuming that the driving direction of the timing belt 30 (which is indicated with an arrow A) is defined as a main scanning direction, the shuttle scanner module 10 and the shuttle ink-jet head module 20 are connected to the timing belt 30 in parallel to the main scanning direction, as described above. The black panel 40 is located facing the shuttle scanner module 10 and the shuttle ink-jet head module 20. This is because the white panel is contaminated by ink sprayed by the shuttle ink-jet head module 20 when the white panel is located facing the shuttle scanner module 10. As described, when either the printable medium I or the document to be scanned is transported to the black panel 40 by a paper feeding unit, the shuttle scanner module 10 or the shuttle ink-jet head module 20 is appropriately transported, and scanning or printing is selectively performed. However, a multifunctional machine integrating the scanning and printing functions has the following problems.

Since the scanner module and the ink-jet head module are located in parallel relationship to the main scanning direction, the volume or size of the multifunctional machine is relatively large. When the document size is smaller than a reference size, parts other than the document are recognized as black, and the data amount thereby increases. In addition, when printing the document scanned as above, since parts other than the document 1a are printed as black, the consumption of toner increases.

In order to prevent parts other than the document 1a from being printed as black, there is an inconvenience in covering the parts other than the document 1a with a separate paper or enlarging the document size when scanning the document.

Figure 3:
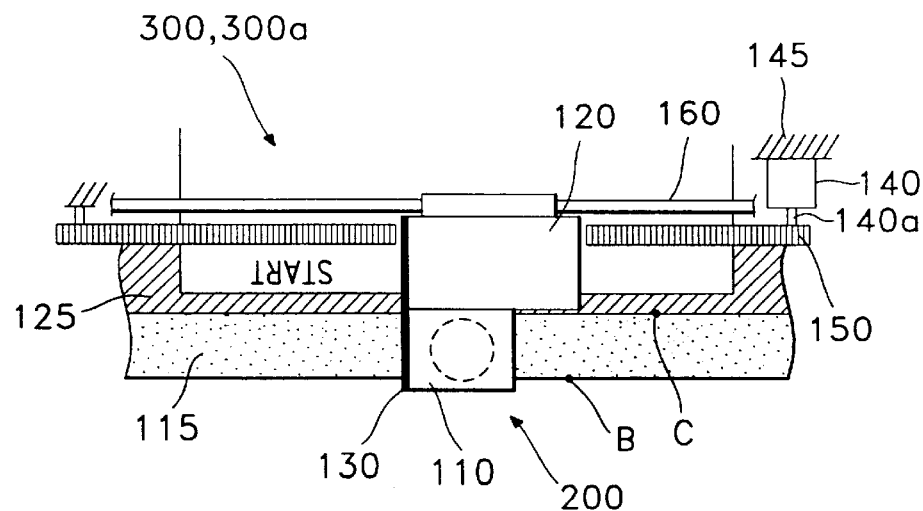
FIG. 3 is a plan view illustrating a combined module and white/black panels according to the present invention.
Figure 4:
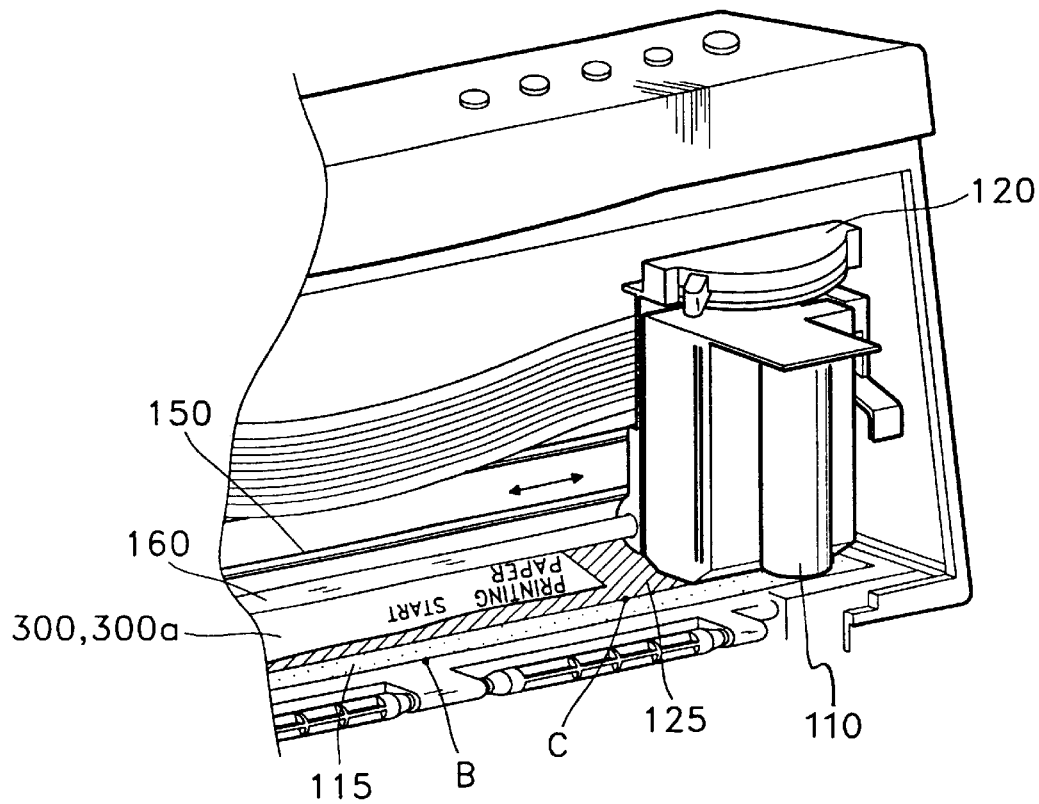
FIG. 4 is a perspective view illustrating the front surface of the multifunctional machine having the combined module according to the present invention.

Referring to FIGS. 3 and 4, a multifunctional machine for scanning and printing according to one embodiment of the present invention is explained.

In the multifunctional machine, a combined module unit 200 includes a combined module case 130 which contains a shuttle scanner module 110 which performs predetermined image processing by scanning a document, and a shuttle ink-jet head module 120 which performs a printing operation by spraying ink in correspondence to data transmitted through a public switched telephone network (PSTN) or printing data inputted from a computer connected through an interface unit. In addition, the multifunctional machine includes a driving unit which enables the combined module unit 200 to perform the shuttle movement; various control programs for operating the multifunctional machine; a memory unit in which data generated in processing the control programs are stored; a central processing unit (CPU) which controls each part of the multifunctional machine according to the control programs; and a paper feeding unit which feeds a document or a printable medium.

The driving unit for driving the combined module unit 200 includes: a driving pulley (not shown) which is connected to a shaft 140a of a carriage return motor 140 fixed at both ends of a housing 145, and which drives in accordance with rotation of the shaft 140a; and a driven pulley (not shown) which is separate from the driving pulley by a certain distance, and which receives power in subordination to the driving direction of the driving pulley. In addition, the driving pulley and driven pulley are connected to a timing belt 150 which converts the rotation movement of the carriage return motor 140 into rectilinearly reciprocating movement, and which transmits power of the driving pulley to the driven pulley. The combined module case 130 of the combined module unit 200 is slidably connected to a guide rail 160 which is formed in a direction corresponding to the direction in which timing belt 150 performs its rectilinearly reciprocating movement so that the combined module unit 200 can stably perform rectilinearly reciprocating movement under the power transmitted by the timing belt 150. It is assumed that the direction in which the combined module unit 200 performs the rectilinearly reciprocating movement is a main scanning direction.

The paper feeding unit (not illustrated) includes: a line feed motor which feeds the printable medium 300 or document 300a to the bottom side of the combined module unit 200 in a sub-scanning direction perpendicular to the main scanning direction; and a paper feeding roller (not illustrated) which feeds the printable medium 300 or document 300a by frictional force with its both surfaces being pressed. Accordingly, the printable medium 300 or the document 300a fed into the combined module unit 200 can be printed or scanned per unit of line. The structure of the combined module unit 200 is explained in detail.

As described above, in the combined module unit 200, the shuttle scanner module 110 and the ink-jet head module 120 are located in the combined module case 130. The shuttle scanner module 110 and the ink-jet head module 120 are arranged along a line in the sub-scanning direction which is the feeding direction of the document 300a to be scanned or the printable medium 300. As a result, the volume of the multifunctional machine can be reduced by locating the scanner module 110 and ink-jet head module 120 along a line in the sub-scanning direction, rather than locating them side by side in the main scanning direction. In addition, at the bottom side of the combined module unit 200, a white panel 115 and a black panel 125 are successively located. That is, at the bottom side of the shuttle scanner module 110, a panel 115 having a color similar to the color of the document 300a to be scanned (e.g., a white panel) is established. Moreover, at the bottom side of the shuttle ink-jet head module 120, the black panel 125 is established. Accordingly, when a document having a size smaller than a reference size of the scanner module 10 is fed, the white panel 115 is exposed at parts other than the document, and thus the white panel 115 is scanned. As a result, the data amount to be processed can be reduced by recognizing the parts where the white panel 115 is exposed as being white. In addition, when printing the scanned image, the parts other than the document are printed as white, and a clean printed image can be obtained. Since the black panel 125 is established facing the bottom side of the shuttle ink-jet head module 120, even if the panel is contaminated by ink sprayed from the ink-jet head module 120, appearance of a stain caused by the ink can be prevented.

Moreover, since the shuttle scanner module 110 and the shuttle ink-jet head module 120 are arranged along a line in the sub scanning direction, the positions where printing and scanning are performed are different from each other. As a result, the position where the document 300a to be scanned is fed is different from the position at which the printable medium 300 are fed are different. In other words, when scanning the document, the central processing unit controls the line feed motor of the paper feeding unit to enable the document to be fed up to an end part B of the white panel 115. When printing, the central processing unit controls the line feed motor to enable the printable medium to be fed up to an end part C of the black panel 125.

Figure 5:
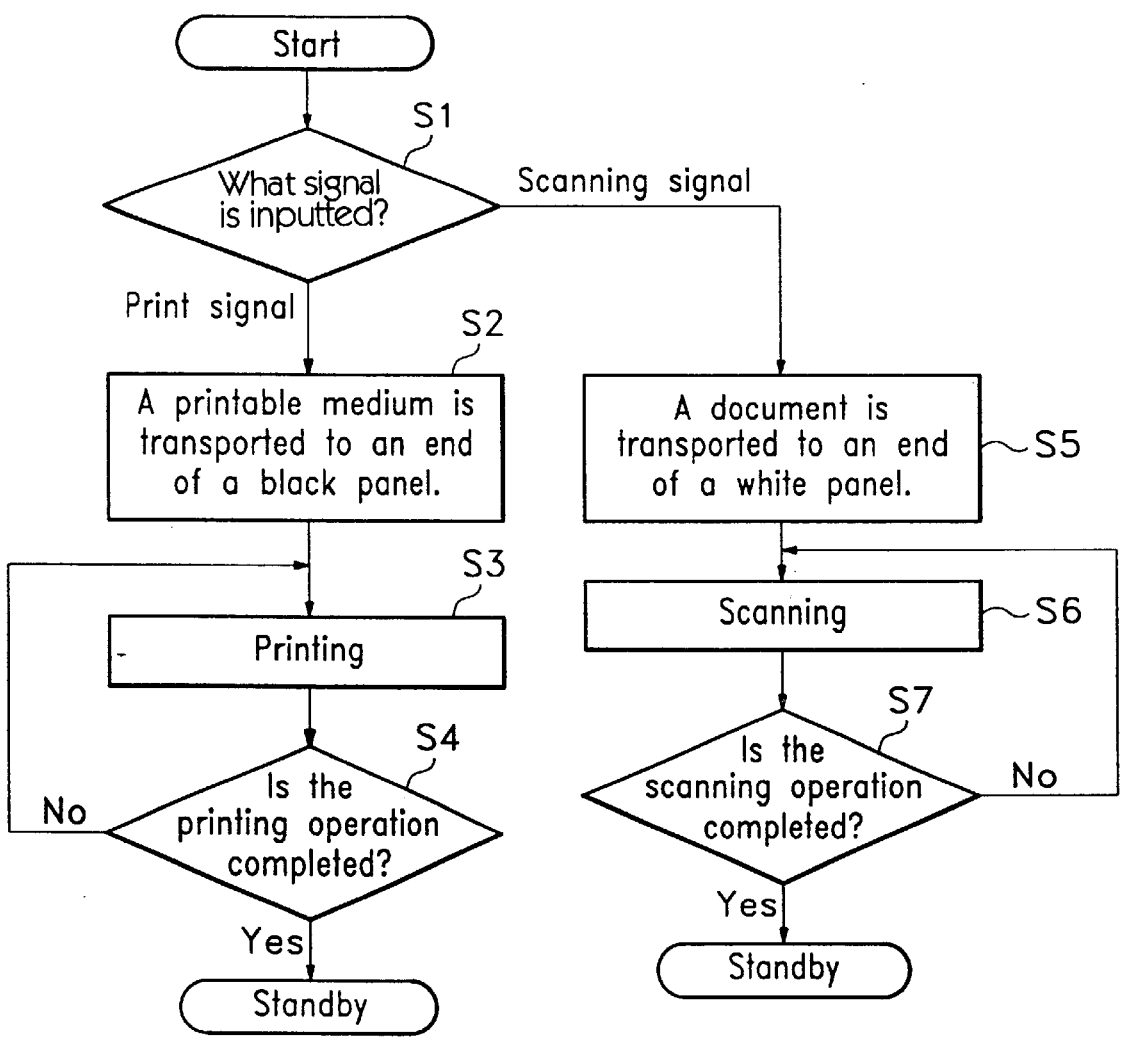
FIG. 5 is a flowchart for illustrating a scanning and printing method in the multifunctional machine according to the present invention.

A scanning and printing method for the multifunctional machine according to one embodiment of the present invention is explained with reference to FIG. 5. First, it is determined whether an inputted signal is a print signal for printing print data or fax data, or a scanning signal for scanning an image of the document 300a (step S1). In the case of a print signal, the central processing unit controls the line feed motor of the paper feeding unit to enable the printable medium 300 to be transported up to the end part B of the black panel 125 (step S2).

When the printable medium 300 is positioned at the end part C of the black panel 125, the print operation is performed by spraying ink from the shuttle ink-jet head module 120 of the combined module unit 200 appropriate to the print data or fax data (step S3). Then, it is determined whether the printing operation is completed (step S4). When the printing operation is completed, the multifunctional machine enters a standby state. When the printing operation is not completed, the printing is continuously performed by returning to step S3.

On the other hand, if it is determined at step S1 that a scanning signal is inputted, the central processing unit controls the line feed motor to enable the document 300a to be transported up to the end part B of the white panel 115 (step S5). When the document 300a is fed up to the end part B of the white panel 115, the carriage return motor 140 operates and the combined module unit 200 performs the shuttle movement, and thereby the shuttle scanner module 110 scans the document (step S6). At this time, even if the document size is smaller than the reference document size, the white panel 115 is scanned at parts other than the document 300a.

Then, it is determined whether the scanning operation is completed (step S7). When the scanning operation is completed, the multifunctional machine enters a standby state. If the scanning operation is not completed, the scanning is continuously performed by returning to step S6.

In the preferred embodiment of the present invention, the scanner module is located in front and the ink-jet head module is located in the rear relative to the direction in which the document or the printable medium is fed. It is also possible to locate the scanner module in front and the ink-jet head module in the rear. In the latter case, the positions of the white panel and black panel are reversed from the positions shown in FIG. 4.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A multifunctional machine for scanning a document and for printing on a printable medium, wherein one of said document and said printable medium is fed in a sub-scanning direction, said multifunctional machine comprising:
    a scanner module which scans the document by performing a shuttle movement in a main scanning direction perpendicular to said sub-scanning direction;
    a printer module disposed adjacent to said scanner module in said sub-scanning direction for printing data onto said printable medium;
    a first panel facing a bottom side of said scanner module in said main scanning direction and having a first color; and
    a second panel facing a bottom side of said printer module in said main scanning direction and having a second color.

2. The multifunctional machine of claim 1, wherein said first panel has a white color.

3. The multifunctional machine of claim 1, wherein said second panel has a black color.

4. The multifunctional machine of claim 1, wherein said scanner module is disposed in front of said printer module in said sub-scanning direction.

5. The multifunctional machine of claim 1, wherein said scanner module is disposed to the rear of said printer module in said sub-scanning direction.

6. The multifunctional machine of claim 1, wherein said second color is darker than said first color.

7. A scanning and printing method for a multifunctional machine which includes a paper feeding unit which feeds one of a document to be scanned and a printable medium in a sub-scanning direction, a scanner module which scans the document by performing a shuttle movement in a main scanning direction perpendicular to the sub-scanning direction, a printer module which is disposed next to the scanner module in the sub-scanning direction and which prints data onto the printable medium, a first panel which faces a bottom side of the scanner module in the main scanning direction and has a first color, and a second panel which faces a bottom side of the printer module in the main scanning direction and has a second color;

said method comprising the steps of:
  determining whether a signal inputted to said multifunctional machine is a printing signal or a scanning signal;
  performing a scanning operation by transporting said document to said first panel when said scanning signal is inputted; and
  performing a printing operation by transporting said printable medium to said second panel when said printing signal is inputted.

8. The method of claim 7, wherein said second color is darker than said first color.

9. A multifunctional machine for scanning a document and for printing on a printable medium, wherein one of said document and said printable medium is fed in a sub-scanning direction, said multifunctional machine comprising:
  scanner means for scanning the document in a main scanning direction;
  printer means disposed adjacent to said scanner module for printing data onto said printable medium;
  a first panel extending in said main scanning direction, facing a bottom of said scanner means, and having a first color; and
  a second panel extending in said main scanning direction, facing a bottom of said printer means, and having a second color.

10. The multifunctional machine of claim 9, wherein said scanner means performs a shuttle movement in the main scanning direction.

11. The multifunctional machine of claim 9, wherein said main scanning direction is perpendicular to said sub-scanning direction.

12. The multifunctional machine of claim 9, wherein said second color is darker than said first color.

13. The multifunctional machine of claim 9, wherein said printer means is disposed adjacent to said scanner means in said sub-scanning direction.

14. The multifunctional machine of claim 9, wherein said first panel has a white color.

15. The multifunctional machine of claim 9, wherein said second panel has a black color.

16. The multifunctional machine of claim 9, wherein said scanner means is disposed in front of said printer means in said sub-scanning direction.

17. The multifunctional machine of claim 9, wherein said scanner means is disposed to the rear of said printer means in said sub-scanning direction.

18. A scanning and printing method for a multifunctional machine in which one of a document to be scanned and a printable medium is fed in a sub-scanning direction, said multi functional machine including a first panel and a second panel disposed substantially in parallel with each other and extending in a main scanning direction, said method comprising the steps of:
  determining whether a signal inputted to said multifunctional machine is a printing signal or scanning signal;
  performing a scanning operation by transporting said document to said first panel when said scanning signal is inputted; and
  performing a printing operation by transporting said printable medium to said second panel when said printing signal is inputted.

19. The method of claim 18, further comprising the steps, when said scanning signal is inputted, of:
  determining whether the scanning operation is completed;
  when the scanning operation is not completed, continuing with the scanning operation; and
  when the scanning operation is completed, assuming a standby mode.

20. The method of claim 18, further comprising the steps, when said printing signal is inputted, of:
  determining whether the printing operation is completed;
  when the printing operation is not completed, continuing with the printing operation; and
  when the printing operation is completed, assuming a standby mode.

21. The method of claim 18, wherein said main scanning direction is perpendicular to said sub-scanning direction.

22. The method of claim 18, further comprising the step of providing the multifunctional machine with a scanner module which scans the document by performing a shuttle movement in the main scanning direction.

23. The method of claim 22, further comprising the step of providing the multifunctional machine with a printer module disposed adjacent to the scanner module in the sub-scanning direction for printing data onto the printable medium.

24. The method of claim 18, further comprising the step of providing the multifunctional machine with a printer module for printing data onto the printable medium.

25. The method of claim 18, wherein said first panel faces a bottom side of a scanner module provided in the multifunctional machine.

26. The method of claim 18, wherein said second panel faces a bottom side of a printer module provided in the multifunctional machine.

* * * * *